Oct. 16, 1934.  W. E. SYKES  1,976,813
TORQUE MEASURING DEVICE
Filed Oct. 31, 1932  2 Sheets-Sheet 1
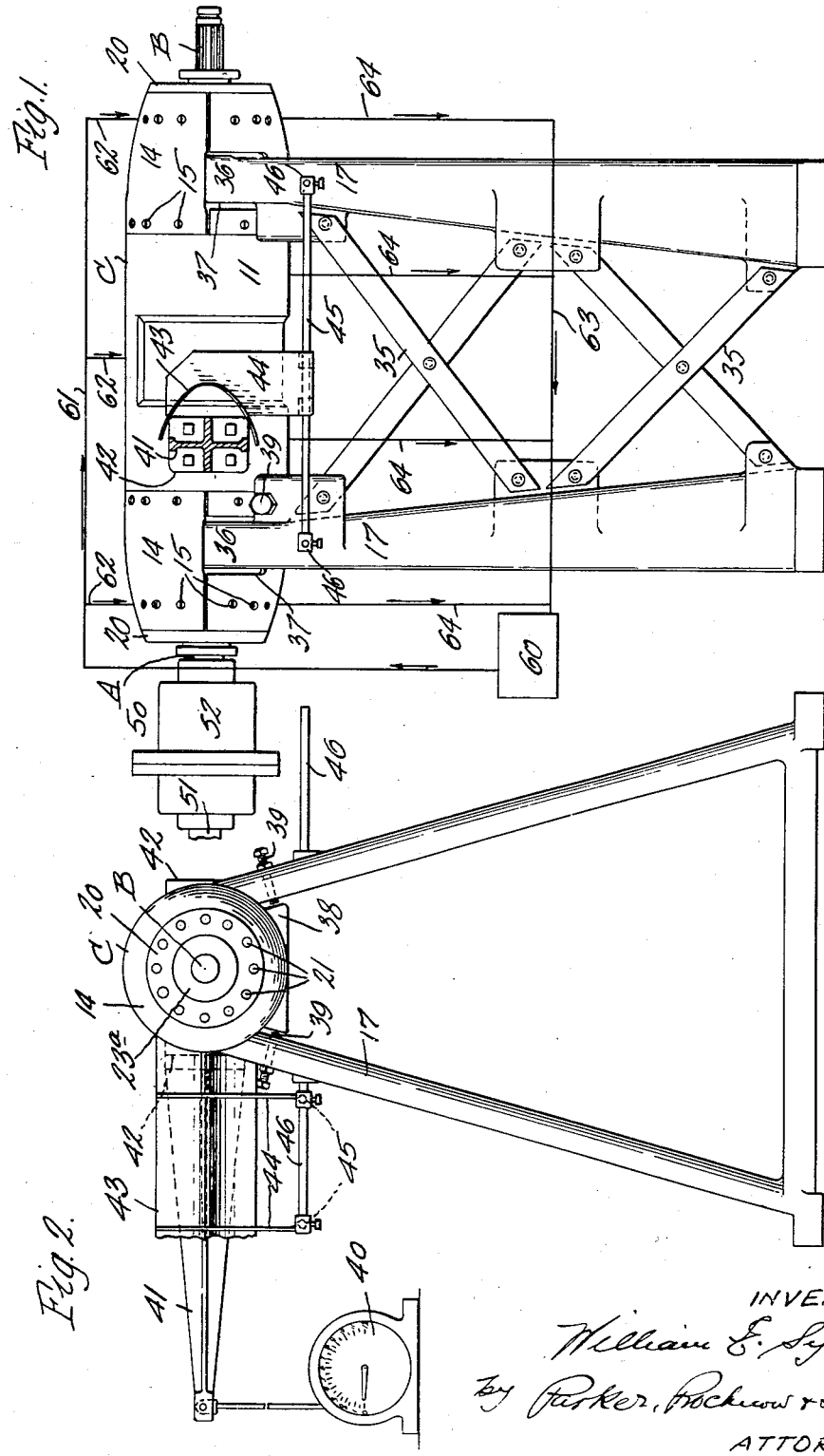
INVENTOR.
William E. Sykes
by Parker, Prochnow & Lerner.
ATTORNEYS.

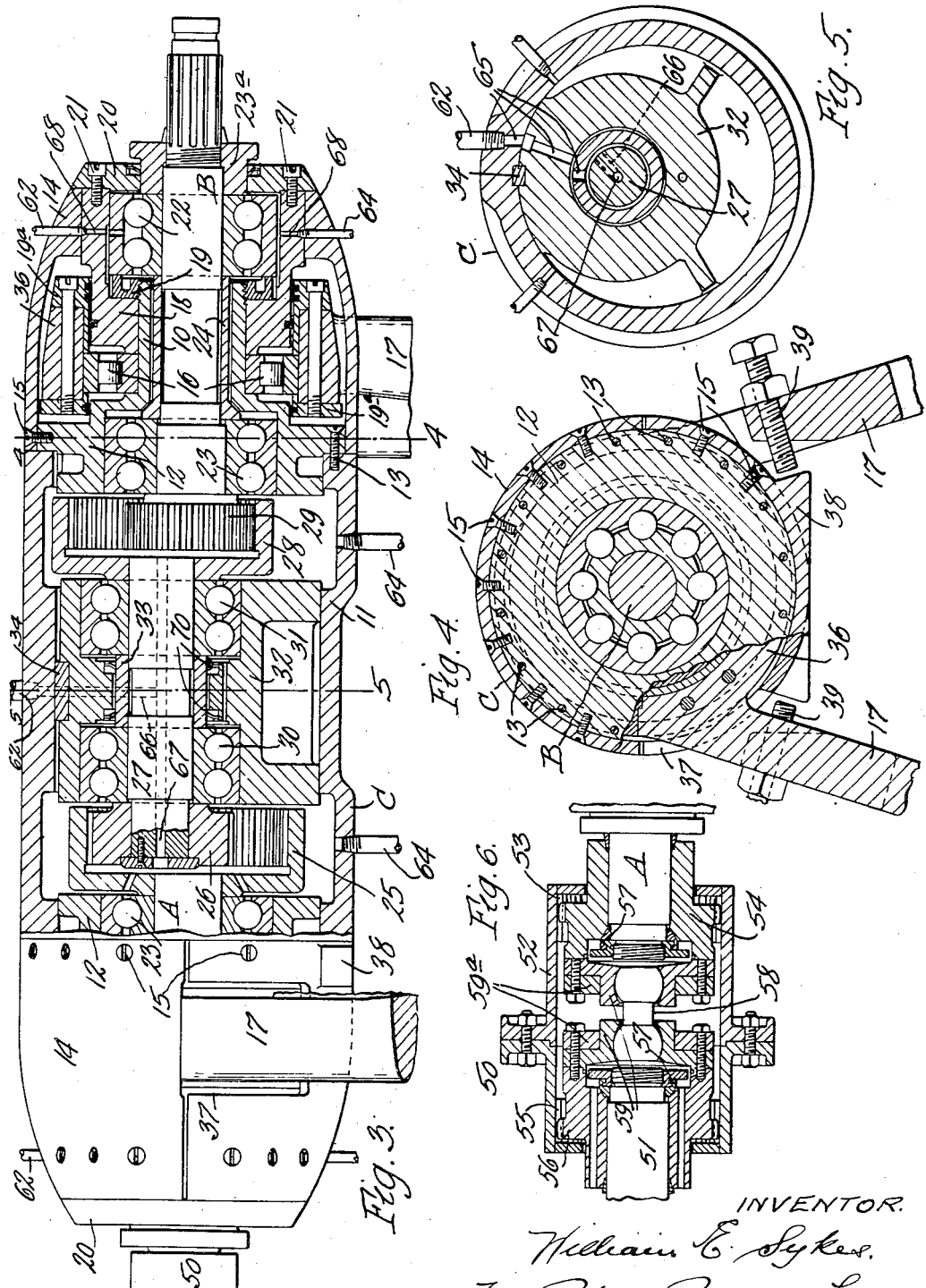

Patented Oct. 16, 1934

1,976,813

UNITED STATES PATENT OFFICE 1,976,813

TORQUE MEASURING DEVICE

William E. Sykes, Buffalo, N. Y.

Application October 31, 1932, Serial No. 640,368

11 Claims. (Cl. 265—25)

This invention relates to dynamometers or torque measuring devices.

One object of the invention is to provide such a device which will be efficient in operation and adapted to transmit comparatively great horse power at high speeds, and has sturdy, durable gearing but is nevertheless of relatively small, compact form.

Other objects of the invention are to provide a device which is adapted to transmit motion for operating a driven element for performing its intended work while at the same time the device is being used for torque testing purposes; in which the device is arranged concentrically with axially alined driving and driven shafts which rotate in the same direction; in which the casing or housing of the device is of slender, elongated and substantially stream line form and disposed concentrically relatively to the shafts which it connects so that the device is adapted for torque stand tests of air cooled aircraft engines and will offer the minimum disturbance to the air current from the airplane propeller; which is arranged concentrically with axially alined driving and driven shafts and is adapted to rotate the driven shaft in the same direction as the driving shaft, and is also adapted for rotation of the shafts in either direction; which is provided with a supporting stand constructed so that the propeller slip stream will be affected as little as possible and so that the engine may be easily mounted; which is adapted to measure shaft end thrust in either direction; which is provided with an efficient, forced feed lubricating system; and which has the other features of improvement and advantage hereinafter described and set forth in the claims.

In the accompanying drawings:

Fig. 1 is a side elevation of a dynamometer or torque measuring device illustrating one practical embodiment of my invention.

Fig. 2 is an end elevation thereof.

Fig. 3 is a fragmentary side elevation thereof, partly in longitudinal section, on an enlarged scale.

Figs. 4 and 5 are transverse sections thereof on lines 4—4 and 5—5 respectively, Fig. 3.

Fig. 6 is a sectional view of the flexible coupling for connecting one shaft of the device with an engine or other driving shaft.

A and B represent two axially alined shafts or elements, one of which, A, may be a driving shaft. Motion is transmitted from one shaft to the other by gearing, preferably housed within a rotatably mounted casing C, from the opposite ends of which the shafts A and B project. Preferably the casing is substantially circular or symmetrical in cross section and of slender, elongated shape with oppositely tapered ends, it thus being of a substantially stream-line form, is concentric with the shafts A, B, and is mounted in a supporting stand by bearing trunnions 10 at opposite end portions of the casing so that the casing is adapted to turn on the stand concentrically about the shafts A and B.

In the preferred construction shown in the drawings, the casing comprises a substantially cylindrical middle shell or portion 11, trunnion blocks 12 which are rigidly secured, as by bolts 13, in the opposite ends of the middle shell 11 and are formed with the outwardly projecting, central trunnions 10, and two sectional tapered end shells 14 which form tapered end extensions of the middle shell 11 and surround the trunnion blocks to which the inner ends of the shells are secured, as by screws 15. The trunnions 10 are rotatably mounted, preferably by roller bearings 16, in the end frames 17 of a stationary stand or supporting frame. The inner ring of each roller bearing is fixedly secured on one trunnion 10 between a shoulder thereof and a securing sleeve 18 held by a nut 19 screwed on the end of the trunnion, while the outer bearing ring is stationarily secured in the end frame 17, as between clamping rings 19a bolted to the end frame. The outer rings are adapted to slide endwise on the bearing rollers, which permits an endwise movement of the casing limited by spaced shoulders on the trunnion blocks and sleeves 18 at opposite ends of each outer bearing ring. Each end of the casing is closed by an end ring 20 secured, as by screws 21, to the outer end of the sleeve 18. While the casing is preferably constructed and mounted in the stand as described, it could be of any other suitable construction and rotatably mounted in any other suitable way.

Each of the shafts A and B is journalled in the adjacent end of the casing, for example, by combined radial and end thrust ball bearings 22 at the outer end of the casing and ball bearings 23 at the inner end of the shaft. 24 is a spacing sleeve extending between and abutting against the inner rings of the bearings 22 and 23 and cooperating with a nut 23a screwed on the shaft for stationarily securing the inner bearing rings on the shaft.

By this bearing construction, the thrust on each shaft is transmitted without lost motion to the casing C, and since the latter is capable of limited endwise movement in its supporting bearings 16, this movement of the casing can be utilized to show the end thrust on either shaft.

The gearing for transmitting motion from one to the other of the shafts A, B, preferably comprises an internal gear wheel 25 integral or rigid with the inner end of the shaft A, a spur pinion 26 meshing therewith and keyed or otherwise fixed on the adjacent end of a countershaft 27, an internal gear wheel 28 fixed to or integral with the opposite end of the countershaft 27, and a spur pinion 29 which is fixed to or integral with the inner end of the other shaft B and meshes with the internal gear 28. The countershaft is preferably journalled eccentrically with respect to the shafts A and B, by ball bearings 30 and 31 at its opposite ends, in a bearing block 32. The inner rings of the ball bearings 30 and 31 may be properly spaced apart by abutting against a spacing sleeve 33. The bearing block 32 for the countershaft is preferably removable from the casing and is held from rotation therein, as by means of a key 34 engaging in a longitudinal keyway in the middle shell. By making this bearing block removable, it can be removed and replaced by other blocks in which the countershaft has a different eccentricity, thus adapting the device to the use of gears having different ratios.

By the described gearing, the shafts A and B rotate in the same direction, the relative speeds of the shafts depending upon the ratios of the gears employed which, as explained, can be changed by removing the countershaft bearing block with the countershaft and gears carried thereby, and replacing this unit with a different unit in which the countershaft is differently disposed eccentrically and is provided with gears of a different size.

The opposite end frames 17 of the supporting stand are rigidly connected to each other as by cross bracing 35, and each end frame 17 is preferably of substantially A-shape having legs which converge toward the gear casing and are of substantially elliptical cross section to minimize the disturbance and resistance to air currents. The upper ends of the legs of each A-frame are joined by a connecting portion 36 which supports the roller bearing for the adjacent trunnion of the casing. As this connecting or bearing portion of the frame is located inside of the end shell of the casing, the latter is provided at its opposite sides with slots or openings 37 through which the legs of the end frames extend, and these openings are made large enough to permit limited rotation of the casing on the stand about the shafts A and B, which angular movement of the casing may be limited by a lug or portion 38 of the casing, adapted to engage opposite stops 39 on one of the end frames 17. The stops shown consist of screws adapted to turn in threaded holes in the end frame so that the screws can be adjusted to hold the casing from rotation if desired, or to permit a desired, limited rotary movement of the casing on the stand.

Because of the arrangement of the countershaft 27 and gears carried thereby in the casing C eccentrically with respect to the shafts A and B, the operation of the device will rotate the casing about the shafts A and B to the extent allowed by the stops 39, and torque can therefore be measured by an indicating or measuring device 40 of any suitable construction actuated by the rotary movement of the casing. As shown, the indicating device is connected to a torque arm 41, which is rigid with and projects laterally from the casing. The casing is preferably provided at its opposite sides with seats 42 to either of which the torque arm may be rigidly secured, as by bolts, thus adapting the device, by securing the torque arm on one or the other side of the casing, to measure torque in either direction of rotation of the shafts A and B.

43 indicates a windshield mounted adjacent the torque arm and shaped so as to deflect air currents away from the arm and minimize disturbance of the air currents by the torque arm. The windshield shown consists of a trough-shaped plate of sheet metal fixed to upright legs or brackets 44 secured at their lower ends to parallel, longitudinal rods 45 which are removably secured at their ends on posts 46 projecting laterally from the end frames 17 of the supporting stand. Preferably these posts 46 are provided at opposite sides of the stand so that the windshield can be mounted in operative relation to the torque arm at whichever side of the device the torque arm may be arranged.

50 represents a coupling for flexibly connecting the shaft A with an engine or other shaft 51 with which the device is to be used for torque testing purposes. This coupling is preferably of that type comprising a casing 52 provided at one end with internal teeth 53 meshing with peripheral teeth on a sleeve 54 which is fixed on the shaft A, and internal teeth 55 at its opposite end similarly meshing with teeth on a sleeve 56 which is fixed on the engine shaft 51, the intermeshing teeth thus locking the casing 52, the sleeves 54 and 56 and their attached shafts against relative rotation. The teeth on the sleeves, however, have convexed outer edges which permit limited misalignment and angular movement of the shaft A and the engine shaft 51. The sleeves 54 and 56 may be keyed or fixed on their respective shafts by securing means 57 of the construction shown, or of any other suitable sort. Arranged axially between the shaft sleeves 54 and 56 is a longitudinal thrust rod or member 58 having a ball and socket or universal connection with each of the sleeves, preferably formed by spherical heads at opposite ends of the thrust rod seated in spherical sockets in socket members 59 secured to and rigid with the sleeves 54 and 56. The socket members 59 shown are made in sections rigidly secured to the sleeves by securing rings 59a bolted to the sleeves. The balls of the thrust rod have a limited universal movement in the sockets so as not to interfere with relative angular movements of the shaft incident to misalignment thereof but the balls are adapted to bear at their inner or outer portions against the spherical walls of the sockets to transmit end thrust in either direction from one to the other of the shafts A and 51. The casing 52 of this flexible coupling is made in separable sections rigidly bolted together as usual, to permit the shafts connected thereby to be aligned and the internal parts of the coupling to be assembled in the casing.

A force feed lubricating system is provided for lubricating the gears and bearings or relatively movable contacting parts of the transmission device for insuring thorough lubrication thereof. This system comprises an oil reservoir and force pump diagrammatically indicated at 60, Fig. 2, having a supply pipe 61 with branches 62 leading to the middle and end portions of the casing C, and a return line 63 with branches 64 leading from the lower end and intermediate portions of the casing, as shown. The middle branch of the supply pipe connects with passages 65 extending through the casing and the bearing block 32 for the countershaft, and the countershaft is provided with a radial passage 66 adapted to receive the oil from the passages 65 and discharge it by a longitudinal passage 67 in the countershaft to the gears at the opposite ends of the countershaft. The oil passes from the chambers in which the gears are located through the inner bearings 23 for the shafts A and B, the oil from these parts discharging through the intermediate branches 64 to the return line 63. Oil is also forced through the end supply branches 62 and connecting passages 68 in the end portions of the casing and end bearings for the shafts A and B through these bearings, and returns through the end branches 64 and return line 63. Suitable oil seals 70 are provided in the countershaft bearing block 32 to seal the ends of the space between the block and the countershaft, and suitable oil seals are also provided in the end rings 20 of the casing to prevent the escape of the oil therefrom. This system insures adequate force feed lubrication for the various working surfaces of the device.

What is claimed is,

1. A torque measuring device comprising an elongated casing of symmetrical cross section having a length at least approximately twice its diameter, axially alined shafts journalled in said casing coaxially therewith and projecting from opposite ends thereof, gearing in said casing for transmitting motion from one of said shafts to the other and including an element rotatable about an axis parallel with but eccentric to the axis of said shafts and geared to each of said shafts by an internal gear meshing with an external gear, said casing being mounted to rotate about said shafts, and torque indicating means actuated by the rotation of said casing.

2. A torque measuring device comprising a slender elongated casing of symmetrical cross section, axially alined shafts journalled in said casing coaxially therewith and projecting from opposite ends thereof, gearing in said casing for transmitting motion from one of said shafts to the other and including an element rotatable about an axis parallel with but eccentric to said alined shafts and geared to each of said shafts by an internal gear meshing with an external pinion, and bearings located within said casing and by which said casing is mounted to rotate concentrically with said alined shafts, and torque indicating means actuated by the rotation of said casing.

3. A torque measuring device comprising a casing, axially alined shafts journalled in said casing and projecting from opposite ends thereof, gearing in said housing for transmitting motion from one of said shafts to the other and including an element located eccentrically of and geared to said shafts, a bearing support for said element removably mounted in said casing and removable therefrom with its supported element as a unit, thereby adapting said unit to be replaced by a different unit bearing an element of different eccentricity, said casing being mounted to rotate relatively to said alined shafts, and torque indicating means actuated by the casing.

4. A torque measuring device comprising a casing, axially alined shafts journalled in said casing and projecting from opposite ends thereof, gearing in said casing for transmitting motion from one of said shafts to the other and including an element rotatable about an axis parallel with but eccentric to the axis of said shafts and geared to said shafts, a block which is removably mounted in said casing and carries said eccentric element and is endwise removable therewith as a unit from said casing, said casing being mounted to rotate concentrically with said alined shafts, and torque indicating means actuated by the rotation of said casing.

5. A torque measuring device comprising a casing, axially alined shafts journalled in said casing and projecting from opposite ends thereof, gearing in said casing for transmitting motion from one of said shafts to the other and including an element rotatable about an axis parallel with but eccentric to the axis of said shafts and geared to said shafts, said casing having its outer periphery concentric with said shafts and being mounted to rotate about said shafts and also to move axially a limited distance under end thrust on said shafts, and torque indicating means actuated by the rotation of said casing.

6. A torque measuring device comprising axially alined shafts, gearing for transmitting motion from one of said shafts to the other and including an element rotatable about an axis parallel with but eccentric to the axis of said shafts and geared to said shafts, a carrier in which said element is journaled and which is mounted to rotate about said alined shafts and has its outer periphery concentric with said alined shafts, and also to move axially a limited distance under end thrust on said shafts, and torque indicating means actuated by the rotation of said carrier.

7. A torque measuring device comprising a slender elongated casing of substantially symmetrical cross section and having opposite tapering ends, axially alined shafts journalled in said casing coaxially therewith and projecting from opposite ends of said casing, gearing in said casing for transmitting motion from one of said shafts to the other and including an element rotatable about an axis parallel with but eccentric to said shafts and geared to each shaft by intermeshing internal and external gears, said casing being mounted to rotate relatively to said shafts, and torque indicating means actuated by the rotation of said casing.

8. A torque measuring device comprising a slender elongated casing of substantially symmetrical cross section and having opposite tapered ends, shafts journalled in said casing coaxially therewith and projecting from opposite ends of said casing, gearing in said casing which transmits motion from one of said shafts to the other and tends to rotate said casing about said shafts, a stand on which said casing is mounted to rotate about said shafts and which has supporting legs of substantially elliptical cross section with the longer axes of the ellipses directed lengthwise of said casing and bearings supported within said casing by said legs and by which said casing is rotatably mounted, and torque indicating means actuated by the rotation of said casing.

9. A torque measuring device comprising a slender elongated casing of substantially symmetrical cross section and having opposite tapering ends, axially alined shafts projecting from opposite ends of said casing, gearing in said casing which transmits motion from one of said shafts to the other and tends to rotate said casing about said shafts, said casing being mounted to rotate relatively to said shafts and having provision for attaching a torque arm thereto to project from either side of the casing, a windshield for deflecting air currents away from said arm, and means for mounting said shield in operative relation to said arm in either arrangement of the arm.

10. A torque measuring device comprising a slender elongated casing of substantially symmetrical cross section, axially alined shafts arranged in said casing coaxially therewith, and extending out of opposite ends of the casing, bearings located in said casing at different points along its axis for rotatably mounting said shafts and for mounting said casing to rotate about said shafts, gearing in said casing for transmitting motion from one of said shafts to the other and including a pinion on one shaft meshing with an intermediate internal gear, and an internal gear on the other shaft meshing with an intermediate pinion, said intermediate internal gear and pinion being connected and journalled in said casing to rotate about an axis parallel with but eccentric to said alined shafts, and torque indicating means actuated by the rotation of said casing.

11. A torque measuring device comprising a casing, axially alined shafts journalled in opposite ends of said casing concentric with the outer periphery of the casing, said casing being rotatable about said shafts, gearing in said casing for transmitting motion from one of said shafts to the other and including a pinion on one shaft meshing with an intermediate internal gear, and an internal gear on the other shaft meshing with an intermediate pinion, a bearing support in which said intermediate gear and pinion are journalled to rotate about an axis parallel with but eccentric to said shafts and which support is removably secured in said casing and is removable endwise therefrom with said intermediate gear and pinion as a unit, and torque indicating means actuated by the rotation of said casing.

WILLIAM E. SYKES.